(12) United States Patent
Muramatsu (10) Patent No.: US 7,073,833 B2
(45) Date of Patent: Jul. 11, 2006

(54) GRIPPER

(75) Inventor: Naoki Muramatsu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/472,939

(22) PCT Filed: Sep. 12, 2002

(86) PCT No.: PCT/JP02/09349

§ 371 (c)(1),
(2), (4) Date: Sep. 26, 2003

(87) PCT Pub. No.: WO2004/024403

PCT Pub. Date: Mar. 25, 2004

(65) Prior Publication Data

US 2004/0189034 A1    Sep. 30, 2004

(51) Int. Cl.
*B25B 9/00* (2006.01)
*E21B 31/12* (2006.01)
*B25J 15/00* (2006.01)

(52) U.S. Cl. .................. 294/100; 294/86.4; 901/38

(58) Field of Classification Search ............... 294/99.1, 294/100, 86.4; 901/23, 31, 41; 977/DIG. 1; B25J 7/00
See application file for complete search history.

(56) References Cited

U.S. PATENT DOCUMENTS 714,989 A * 12/1902 Worthington ............ 294/86.14
4,671,553 A * 6/1987 Bertini ..................... 294/88
5,317,939 A * 6/1994 Marinescu ................ 81/53.11
5,335,953 A * 8/1994 Luther, Sr. ................ 294/19.2
5,538,305 A * 7/1996 Conway et al. ........... 294/119.1
5,924,175 A * 7/1999 Lippitt et al. .............. 24/537
6,605,104 B1 * 8/2003 Sato et al. ................. 606/206

FOREIGN PATENT DOCUMENTS

| JP | 59-201738 | 7/1986 |
| JP | 61-112889 | 7/1986 |
| JP | 61-230890 A | 10/1986 |
| WO | WO 99/30877 A1 | 6/1999 |

* cited by examiner

*Primary Examiner*—Eileen D. Lillis
*Assistant Examiner*—Michael Lowe
(74) *Attorney, Agent, or Firm*—Sughrue Mion, PLLC (57) ABSTRACT

A gripper comprises a motor 25, contained within a case 32, for driving a translational nut 23 that is moved in translation, a finger 20 having one end connected to the translational nut 23, with the other end being connected to the case 32, in which when the one end is pulled upon a movement of the translational nut, the finger is expanded in the amount of displacement at a top end, a plate-like stopper member 26 connected to one end of the finger 20 and having a projecting piece 26b around the outer periphery thereof, a holder member 22 for inserting loosely the projecting piece 26b, a locating nut 28 for adjusting a predetermined gap from the stopper member 26 by being threadingly engaged with a threaded portion of the holder member 22, and a spring 29 for pressing the locating nut 28.

20 Claims, 14 Drawing Sheets

GRIPPER

TECHNICAL FIELD

The present invention relates to improvements in a gripper for gripping a minute part, and more particularly to a gripper that can simply adjust the amount of opening or closing.

BACKGROUND ART

In International Patent WO 99/30877, the present inventor disclosed a high efficient gripper consisting of an extremely simple mechanism. Such gripper has a feature of transforming a slight amount of translation to an amount of bending displacement expanded tens times larger at a finger tip by applying a buckling phenomenon to the long columns of the fingers without using any special displacement expanding mechanism.

Such gripper can grip the minute part softly, and is suitable for robot hands, for smaller and lighter.

However, there was a problem that the gripper did not vary the amount of opening or closing the fingers and was limited in the size of a gripped object.

DISCLOSURE OF THE INVENTION

This invention has been achieved to solve the above-mentioned problems, and it is an object of the invention to provide a gripper having adjustment means for adjusting the amount of opening or closing the fingers with a simple constitution.

A first invention provides a gripper characterized by including a driving source for driving a translational portion that is moved in translation, the driving source being contained within a case, a displacement expanding member having one end connected to the translational portion, with the other end being connected to the case, in which when the one end is pulled upon a movement of the translational portion, the displacement expanding member is extended over an amount of the movement from the one end and the other end, and has an expanded amount of displacement at a common top end, a plate-like stopper member connected to one end of the displacement expanding member and having a projecting piece around the outer periphery thereof, a first holder member having a cylindrical portion with a first notch for inserting loosely the projecting piece of the stopper member, and provided with a threaded portion around the outer periphery of the cylindrical portion, a locating nut for adjusting a predetermined gap from the stopper member by being threadingly engaged with the threaded portion of the holder member, and pressing means for pressing the locating nut.

Herein, "the driving source is contained with the case" means that a part or all of the driving source is contained within the case. With such gripper, the translational portion is moved until the stopper member makes contact with the locating nut, so that the top end of the displacement expanding member is closed by a predetermined amount. Accordingly, there is the effect that the displacement expanding member has an adjustable amount of closing by making the setting of the locating nut variable.

A second invention provides the gripper, characterized by further including a connection member having a connection portion for connecting one end of the displacement expanding member and a projection projecting in a direction against the connection portion, and the holder member having a concave portion for allowing the connection member to be engaged in.

With such gripper, the displacement expanding member is connected to the connection member, whereby there is the effect that the linkage between the holder member and the displacement expanding member is easier.

A third invention provides the gripper, characterized by further including a mounting adapter member having a reference portion, with a convex portion at one end, serving as a reference for mounting and a flange portion, and the holder member having a second notch provided on a cylindrical portion of the holder member to be engaged by a convex portion of the mounting adapter member.

With such gripper, the flange portion has the convex portion engaged in the notch of the holder member in assembling. Hence, the flange portion is securely fitted with the holder member in a rotationally positional relation at any time, whereby the reference portion of the flange portion and the displacement expanding member have a fixed positional relation at any time. Accordingly, the gripper is exchanged halfway of the work, the position of the displacement expanding member can always maintain a predetermined relation with the workpiece, resulting in the effect that there is no need for adjusting the operation mechanism for the displacement expanding member.

A fourth invention provides a gripper characterized by including a driving source for driving a translational portion that is moved in translation, the driving source being contained within a case, a displacement expanding member having one end connected to the translational portion, with the other end being connected to the case, in which when the one end is pulled upon a movement of the translational portion, the displacement expanding member is extended over an amount of the movement from the one end and the other end, and has an expanded amount of displacement at a common top end, a second holder member, to which the other end of the displacement expanding member is connected, having a cylindrical portion and a tapped hole bored in the cylindrical portion, a screw member threadingly engaging the tapped hole, and a locating member secured to the translational portion and having a contact portion making contact with the screw member.

Herein, "the driving source is contained with the case" means that a part or all of the driving source is contained within the case. With such gripper, the translational portion is moved forward or backward by a predetermined amount of movement by allowing the screw member to adjust the distance between the screw member and the contact portion of the locating member. Accordingly, there is the effect that the displacement expanding member has an adjustable amount of opening or closing at the top end thereof.

A fifth invention provides the gripper, characterized in that the tapped hole including at least two holes of a first tapped hole and a second tapped hole, and the contact portion is shaped to be almost triangular.

With such gripper, the translational portion has a settable amount of movement by adjusting the translational position of each of two screw members. Accordingly, there is the effect that the displacement expanding member has an adjustable amount of opening or closing at the top end thereof.

A sixth invention provides the gripper, characterized in that the stopper portion has a shock eliminating function of a ball plunger or the like.

With such gripper, the locating arm collides with the stopper flexibly. Accordingly, there is the effect that the locating arm is less likely to wear.

BRIEF DESCRIPTION OF THE DRAWINGS

FIGS. 3A to 3D are appearance views showing a finger holder of FIG. 1, wherein

FIGS. 4A and 4B show a locating plate as shown in FIG. 1, wherein

FIGS. 5A to 5C show a motor retainer as shown in FIG. 1, wherein

FIGS. 6A and 6B show a locating nut as shown in FIG. 1, wherein

FIGS. 7A and 7B show a mounting adapter according to another embodiment of the invention, wherein

FIGS. 9A and 9B show a locating arm as shown in FIG. 8, wherein

FIGS. 10A to 10C show a motor retainer as shown in FIG. 8, wherein

FIGS. 12A and 12B show a locating arm according to another embodiment of the invention, wherein

FIGS. 14A and 14B show a ball plunger according to another embodiment of the invention, wherein

BEST MODE FOR CARRYING OUT THE INVENTION

EMBODIMENT 1

Figure 1:
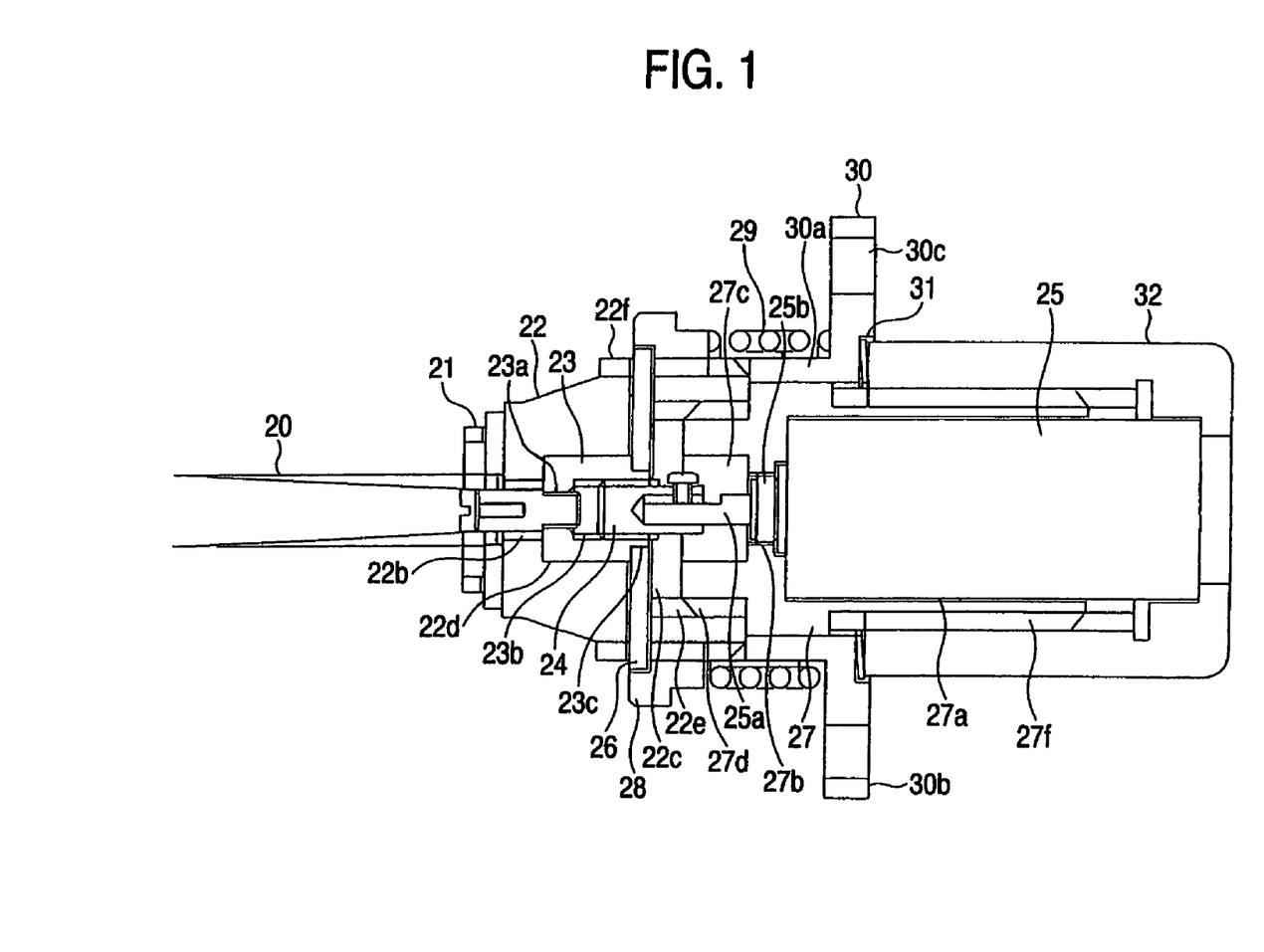
FIG. 1 is a cross-sectional view showing the constitution of a gripper according to one embodiment of the present invention.
Figure 2:
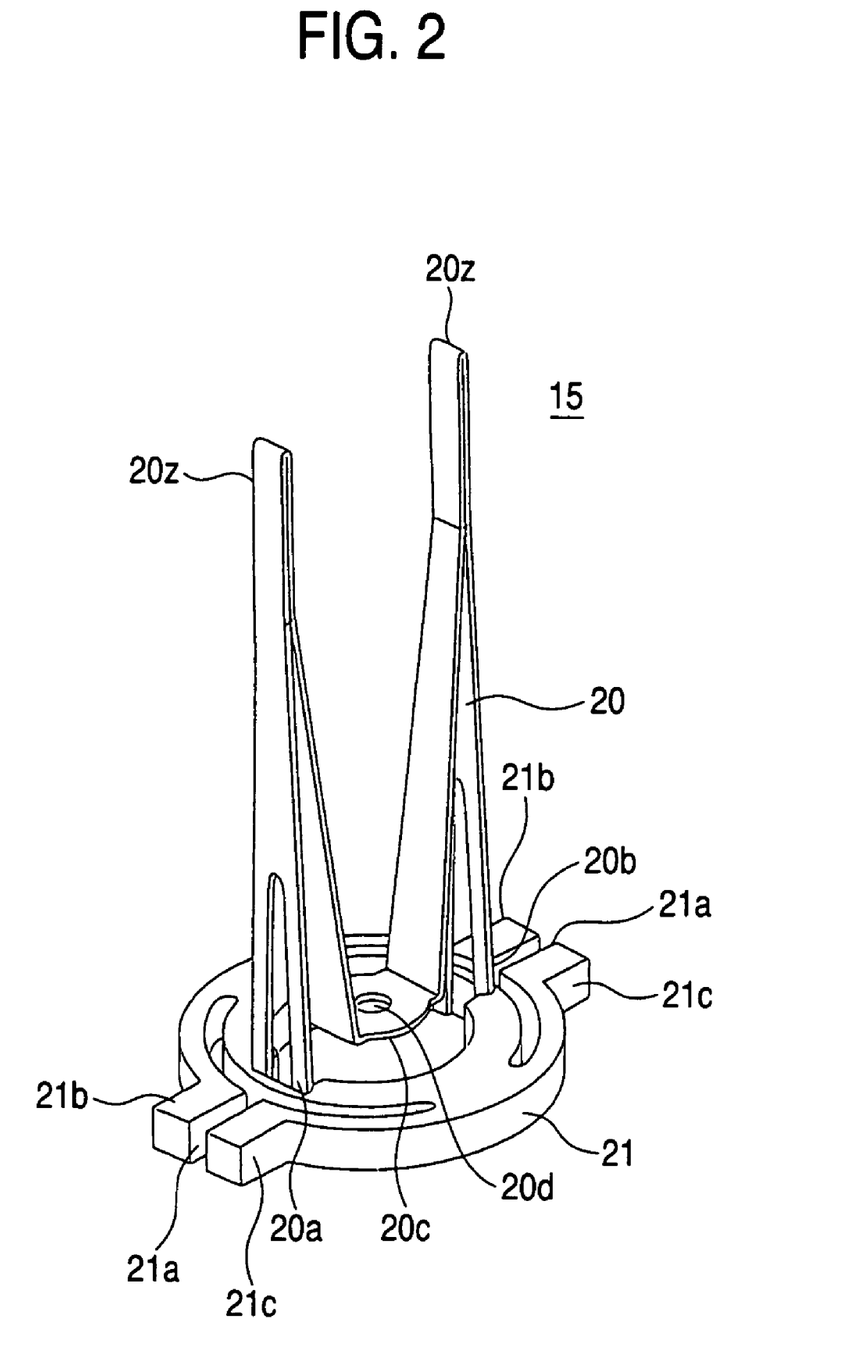
FIG. 2 is a perspective view showing a finger unit of FIG. 1.
Figure 3A:
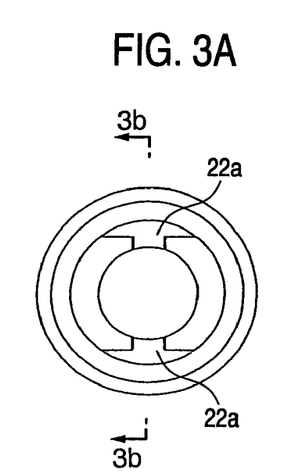
FIG. 3A is a front view.
Figure 3B:
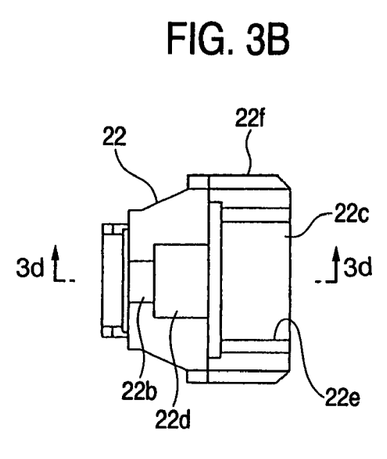
FIG. 3B is a cross-sectional view taken along the arrow 3b—3b.
Figure 3C:
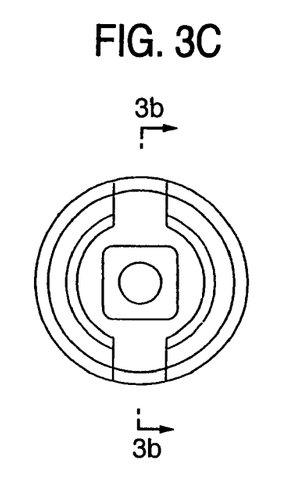
FIG. 3C is a bottom view.
Figure 3D:
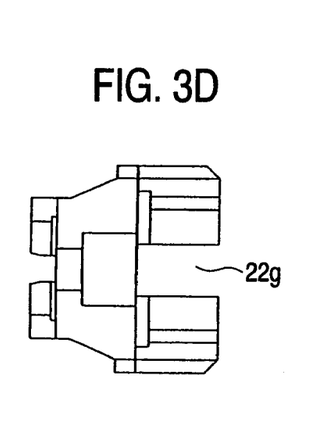
FIG. 3D is a cross-sectional view taken along the arrow 3d—3d.
Figure 4A:
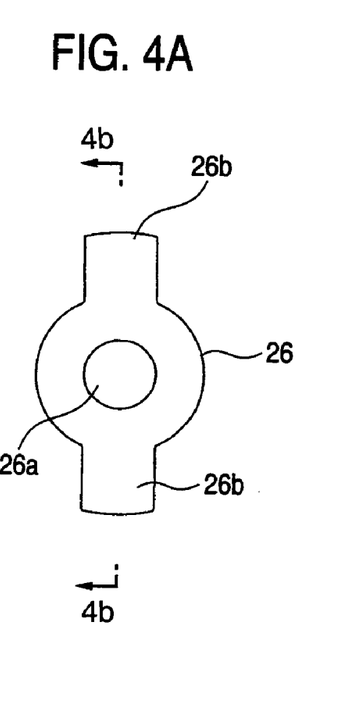
FIG. 4A is a front view and FIG. 4B is a side view taken along the arrow 4b—4b.
Figure 4B:
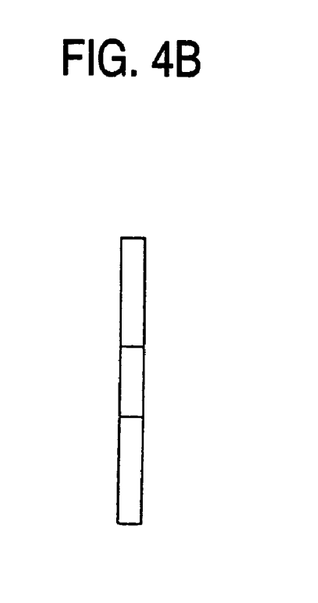
Figure 5A:
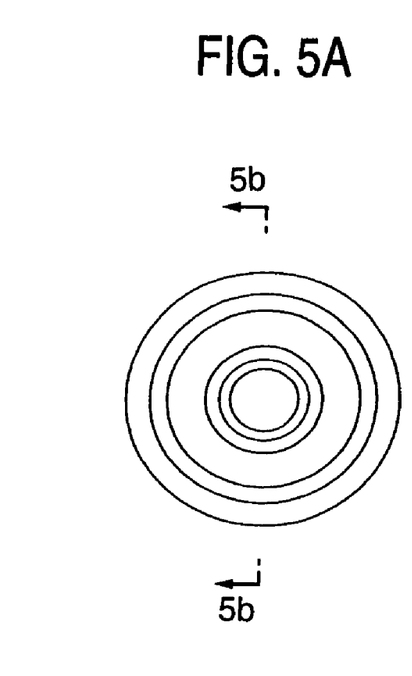
FIG. 5A is a front view.
Figure 5B:
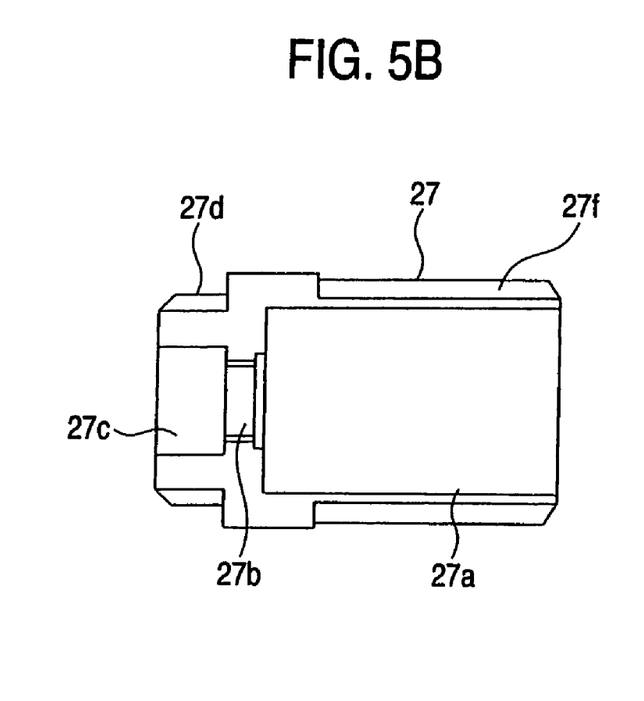
FIG. 5B is a cross-sectional view taken along the arrow 5b—5b and FIG. 5C is a bottom view.
Figure 5C:
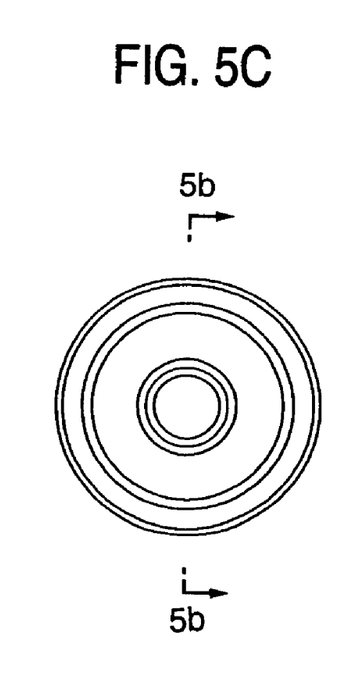
Figure 6A:
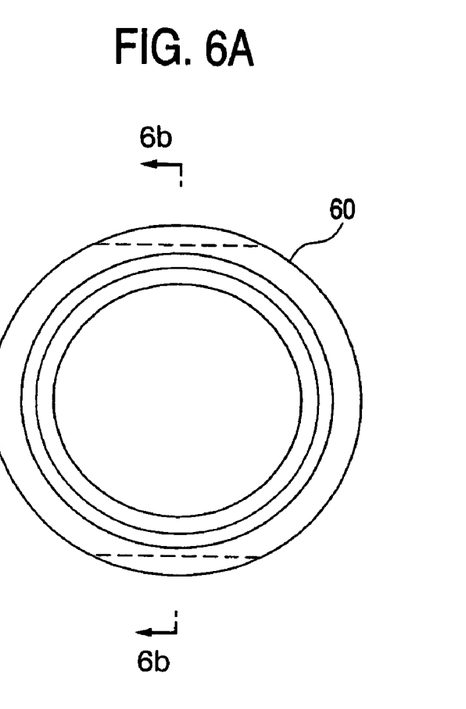
FIG. 6A is a front view and FIG. 6B is a cross-sectional view taken along the arrow 6b—6b.
Figure 6B:
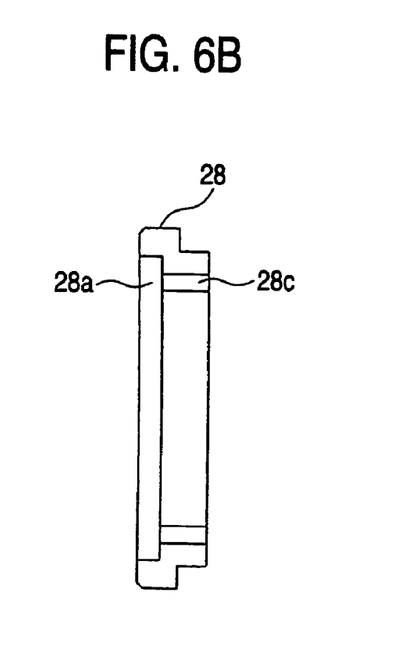

Referring to FIGS. 1 to 6B, an embodiment of the invention will be described below. FIG. 1 is a cross-sectional view of a gripper in the embodiment of the invention. FIG. 2 is a perspective view of a finger unit of FIG. 1. FIGS. 3A to 3D are appearance views of a finger holder of FIG. 1. FIGS. 4A and 4B are appearance views of a locating plate of FIG. 1. FIGS. 5A to 5C are appearance views of a motor retainer of FIG. 1. And FIGS. 6A and 6B are appearance views of a locating nut of FIG. 1.

In FIG. 1, the gripper includes an operation mechanism having a finger 20, a translational driving mechanism having a translational portion for translating one end of the finger 20, and an adjustment mechanism for adjusting the amount of closing the finger 20 with a locating nut 28. The operation mechanism is composed of a finger unit 15 having the finger 20 and a finger holder 22 for securing the finger unit 15.

Herein, the finger 20 has the leg portions 20a, 20b at the other end portion connected to a case 32, and a shared portion 20c at one end portion connected to a translational nut 23 as the translational portion, in which when the shared portion 20c is pulled along with a translational movement, the leg portions 20a, 20b and the shared portion 20c are extended more than an amount of translational movement, so that the amount of displacement between the common top ends 20z, 20z is expanded. The finger 20 has an inverse W shape provided with two V-character pieces shaped almost like V-character.

In FIG. 2, the finger unit 15 is composed of the finger 20, and a finger base 21 with a slit 21a formed in the projections 21b and 21c, in which the leg portions 20a and 20b having a spring force in the finger 20 are engaged in the notches of the finger base 21. The finger 20 as a displacement expanding member is formed to release or grip a workpiece, in which the leg portions 20a and 20b are formed with a slit to have a spring force, and a set tapped hole 20d in the central shared portion 20c.

In FIGS. 3A to 3D, the finger holder 22 as a holder member is formed with the base retainer 22a into which the projections 21b and 21c of the finger unit 15 are fitted and set, two cylindrical portions 22b and 22c internally provided, and a nut retainer 22d with a concave portion of square pole for engaging the translational nut 23 and having a rectangular cross section between a cylindrical portion 22b and a cylindrical portion 22c, in which a threaded portion 22e and a threaded portion 22f are formed around the inner and outer peripheries of the cylindrical portion 22c, and two first notches 22g are formed in the central part of the cylindrical portion 22c.

In FIG. 1, the translational nut 23 serving as a translational portion and a connection portion is formed in the shape of a square pole to engage the nut retainer 22d of the finger holder 22, and formed, at one end, with a columnar screw retainer 23a having a tapped hole at the top end, a threaded portion 23b around the cylindrical portion, and a boss 23c consisting of a cylindrical projection around the outer periphery at the other end. A screw shaft 24 fixed by a screw with a rotational shaft 25a of a motor 25 as a driving source engages the threaded portion 23b, and the screw retainer 23a has the finger unit 15 screwed into a hole 20d.

The translational driving mechanism includes the motor 25, a motor retainer 27 for securing a surface of the motor 25, and formed with the threaded portions 27d and 27f around the outer periphery of the cylindrical portions 27c and 27a, and a cylindrical case 32 for accommodating the motor 25 by being threadingly engaged with a threaded portion 27f. In FIGS. 5A to 5C, the motor retainer 27 has a cylindrical portion 27b formed with a threaded portion around the inner periphery, and an inner cylindrical portion 27c provided at the top end and formed with a threaded portion 27d around the outer periphery, whereby the rotational shaft 25a of the motor 25 projects into the inner cylindrical portion 27c of the motor retainer 27 in a state where the threaded portion 27b of the motor retainer 27 is engaged with the threaded portion 25b at the top end of the motor 25. On the other hand, the threaded portion 27d of the motor retainer 27 is engaged with the threaded portion 22e of the cylindrical portion 22c for the finger holder 22.

The adjustment mechanism includes a locating plate 26 as a stopper member, the locating nut 28 threadingly engaged with the threaded portion 22f around the outer periphery of the finger holder 22, a spring 29, a mounting adapter 30 for mounting on a robot, and a web washer 31.

In FIGS. 4A and 4B, the locating plate 26 is formed with the stoppers 26b, 26b that are two projecting pieces around the outer periphery, and has a hole 26a in the central part. If the hole 26a is engaged by the boss 23c of the translational nut 23, the stoppers 26b, 26b are inserted loosely into the notch 22g of the finger holder 22 to project slightly from the threaded portion 22f formed around the outer periphery, as shown in FIG. 1.

In FIGS. 6A and 6B, the relatively thin locating nut 28 is provided with a ring-like arm retainer 28a with a step at one end portion, and formed with a threaded portion 28c around the inner periphery to be threadingly engaged with the threaded portion 22f of the finger holder 22. In FIG. 1, the mounting adapter 30 is provided with a cylindrical boss 30a and a flange 30b at the other end portion, the flange 30b being formed with a plurality of tapped holes 30c.

In FIG. 1, the mounting adapter 30 is fitted around the outer periphery of the motor retainer 27, with the other end being fixed via the web washer 31 to the case 32, whereby the locating nut 28 serves as a detent owing to a compression restoring force produced by a spring 29 as pressing means. Moreover, when the spring 29 and the web washer 31 are compressed in a state where the case 32 is attached to the motor retainer 27 as shown in FIG. 1, an inner bottom portion of the case 32 presses the other end portion of the motor 25 to an excessive extent. The spring 29 closes the finger 20 and presses the locating nut in a direction where the translational nut 23 is moved.

Referring to FIG. 1, the operation of the gripper as constituted above will be described below. First of all, the locating nut 28 is rotated so that a gap between the arm retainer 28a of the locating nut 28 and the locating plate 26 may be an appropriate amount by adjusting the angle of the rotation. In this state, the translational nut 23 reaches a bottom portion of the cylindrical portion fitted into the nut retainer 22d, namely, the top end of the finger 20 shaped like V-character is opened by a certain amount, as shown in FIG. 1. If the power of the motor 25 is turned on in this state, the rotational shaft 25a is rotated to transmit the rotation via the screw shaft 24 to the translational nut 23, so that the translational nut 23 is displaced to the right axially within the nut retainer 22d, as shown in FIG. 1. Along with this displacement, the central shared portion 20c of the finger 20 is also forcefully displaced in the same direction. Thereby, the finger 20 is subjected to a bending moment, and bent about ten times larger than a displacement of the translational nut 23 in a direction where the top end is closed. On the other hand, if the rotation of the motor 25 is reversed, the central shared portion 20c of the finger 20 is returned to the left axially, so that the finger 20 is also restored to its original state as shown in FIG. 1.

In the case where the closing amount of the finger 20 is not appropriate, the locating nut 28 is rotated in this state to adjust its position. By repeating the above operation, the locating nut 28 is rotated to have a predetermined closing amount of the finger 20 and set at that position.

As described above, the gripper allows the adjustment for the position of the locating plate 26 fitted with the translational nut 23 by rotating the locating nut 28. Accordingly, the central shared portion 20c of the finger 20 is displaced (pulled) a predetermined amount to the right in the axial direction by the translation nut 23, so that the top end of the finger 20 is displaced more than the predetermined amount in the closing direction. Accordingly, it is possible to provide the gripper capable of adjusting the closing amount of the finger 20 in accordance with the size of workpiece or a gripping force.

EMBODIMENT 2

Figure 7A:
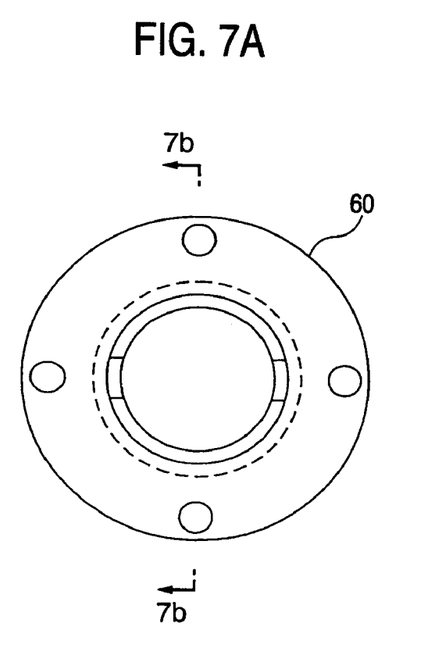
FIG. 7A is a front view and FIG. 7B is a cross-sectional view taken along the arrow 7b—7b.
Figure 7B:
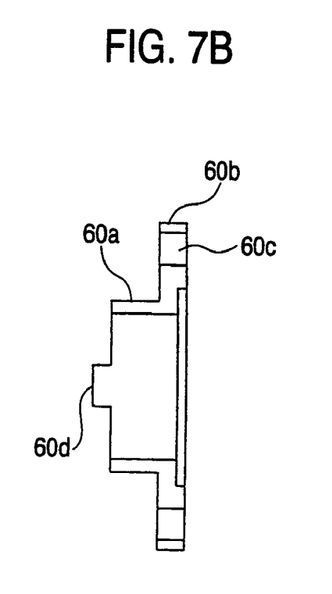

Referring to FIGS. 7A and 7B, an embodiment of the invention will be described below. FIGS. 7A and 7B are appearance views of a mounting adapter in the embodiment of the invention. In the embodiment 2, the mounting adapter 60 as shown in FIGS. 7A and 7B is employed, instead of the mounting adapter 30 in the embodiment 1.

In FIGS. 7A and 7B, the mounting adapter 60 is formed with a cylindrical boss 60a, a flange 60b provided at the other end portion, a plurality of tapped holes 60c serving as the reference in attaching the gripper to the flange 60b, and a projection 60d as a convex portion to be fitted in a second notch 22g of the finger holder 22 at an end portion of the boss 60a. The constitution and operation of an operation mechanism and a driving mechanism are the same as in the embodiment 1.

Referring to FIGS. 1, 3A to 3D, 7A and 7B, the operation of the above gripper will be described below. In assembling the gripper, the mounting adapter 60 has the projection 60d fitted into the notch 22g of the finger holder 22 so that the tapped holes 60c are always placed at a predetermined rotational position with respect to the finger 20.

Accordingly, even if the gripper is exchanged due to its expired life, the finger 20 is retained at a certain positional relation to the workpiece before and after the exchange, whereby there is no need for adjusting the operation mechanism for the finger 20 even if the gripper is exchanged.

EMBODIMENT 3

Figure 8:
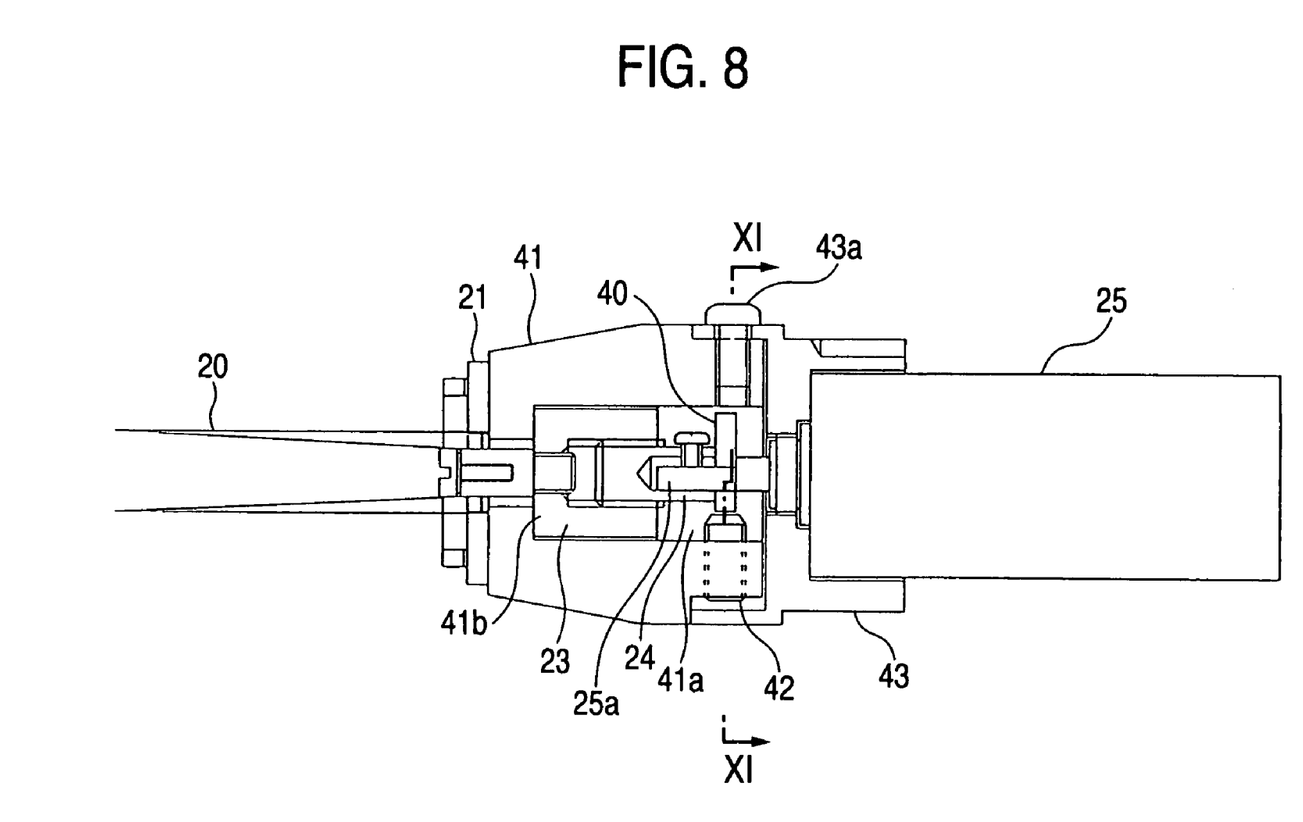
FIG. 8 is a cross-sectional view showing the constitution of a gripper according to another embodiment of the invention.

Referring to FIGS. 8 to 11, an embodiment of the invention will be described below. FIG. 8 is a cross-sectional view showing the entire constitution of a gripper, corresponding to FIG. 1 in the embodiment 1. In FIG. 8, the mounting adapter 30 and the case 32 are omitted, because they are unnecessary for the explanation. Particularly in the embodiment 3, the case 32 containing the entire motor 25 can be omitted.

This embodiment employs a finger holder 41, a motor retainer (case in claim 4) 43 and a locating arm 40, instead of the finger holder 22, the motor retainer 27 and the locating plate 26 in the embodiment 1.

The gripper includes the motor retainer 43 for receiving an end portion of the motor 25, the finger holder 41 for holding a cylindrical peripheral end portion of the motor retainer 43 by being fixed by a screw 43a, the locating arm 40 being fitted through the rotational shaft 25a of the motor 25, and a stopper 42 as a screw member composed of a set screw engaged around the outer periphery of the other end portion of the finger holder 41. The finger holder 41 has an inner cylindrical portion 41a for accommodating the translational nut 23 and a nut retainer 41b on the bottom portion behind the inner cylindrical portion 41a.

Figure 9A:
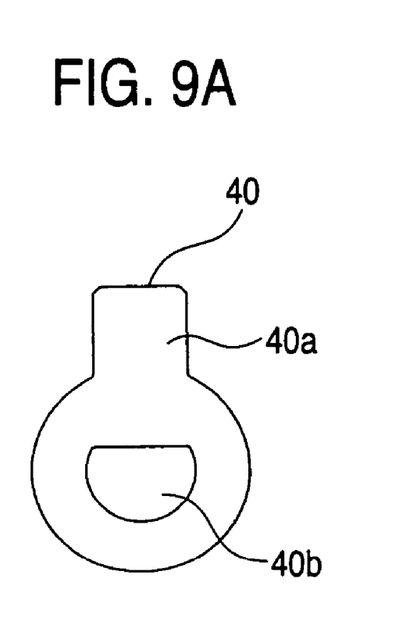
FIG. 9A is a front view and FIG. 9B is a side view.
Figure 9B:
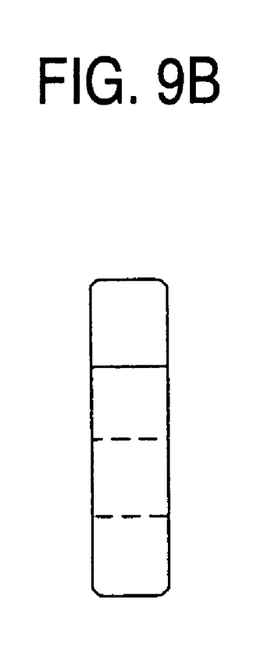
Figure 10A:
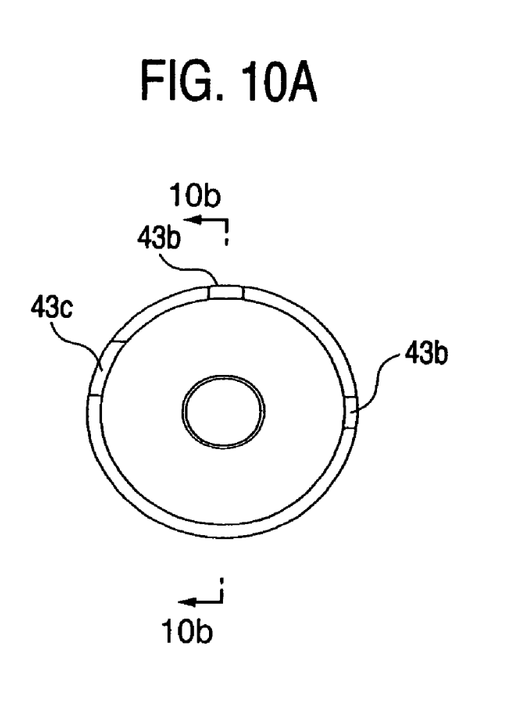
FIG. 10A is a front view.
Figure 10B:
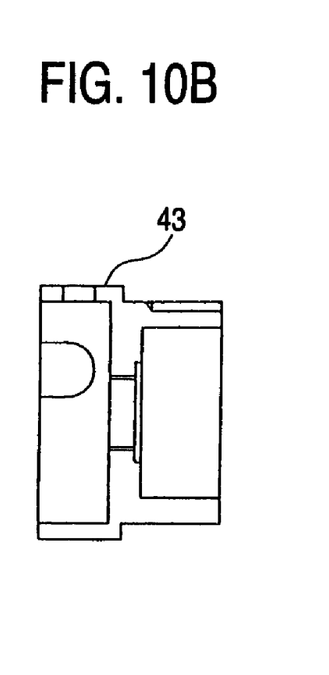
FIG. 10B is a cross-sectional view taken along the arrow 10b—10b and FIG. 10C is a bottom view.
Figure 10C:
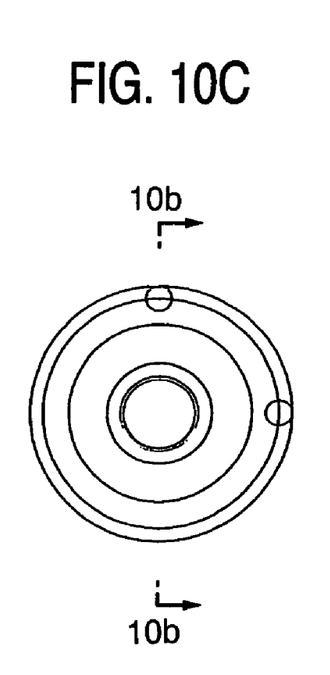

In FIGS. 9A and 9B, the locating arm 40 as a locating member has an arm 40a as a projecting contact portion, and a circular portion formed with a hole 40b shaped similarly to the rotational shaft 25a to be fitted through the rotational shaft 25a of the motor 25. In FIGS. 10A to 10C, the motor retainer 43 is formed with the holes 43b, 43b for passing a threaded portion of the screw 43a on the cylindrical portion at the end portion, and a tapped hole 43c for engaging the stopper 42 as the screw member.

Figure 11:
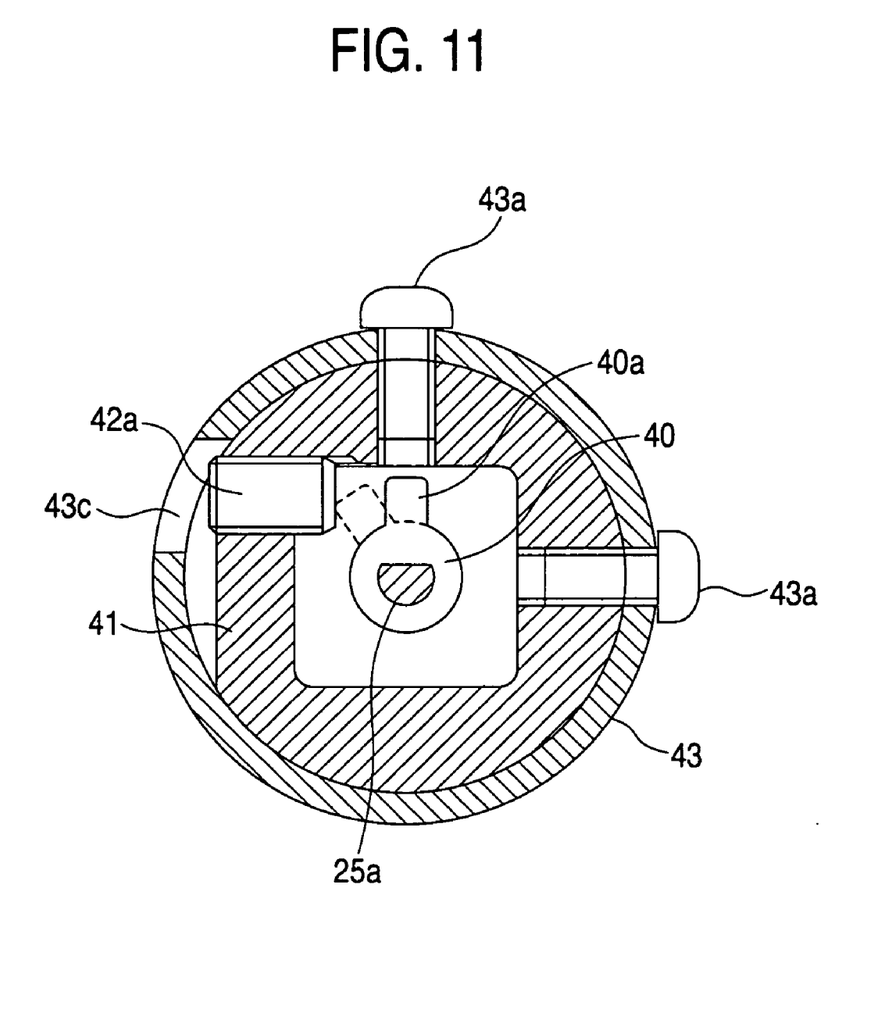
FIG. 11 is a cross-sectional view taken along the arrow XI—XI in FIG. 8.

Referring to FIGS. 8 and 11, the operation of the gripper as constituted above will be described below. In FIG. 8, like FIG. 1, the translational nut 23 reaches a bottom portion of the cylindrical portion fitted into the nut retainer 41b, in which the tip end of the finger 20 is opened by a certain amount.

If the power of the motor 25 is turned on in this state, the locating arm 40 is rotated from the position of the solid line to the position of the broken line as indicated in FIG. 11, along with the rotation of the rotational shaft 25a of the motor 25, until the arm 40a makes contact with the stopper 42, while the translational nut 23 is displaced within the nut retainer 41b to the right axially as indicated in FIG. 8, so that the finger 20 is closed by the same operation of the embodiment 1.

On the other hand, if the motor 25 is reversely rotated, the translational nut 23 is displaced to make contact with an inner bottom face of the nut retainer 41b, and the finger 20 is restored to the state of FIG. 8.

In the case where the closing amount of the finger 20 is increased, if the stopper 42 is rotated backward by a driver, the locating arm 40 has an increased amount of rotation in a direction toward the broken line, so that the central shared portion 20c of the finger 20 is more forcefully displaced. Accordingly, the finger 20 is largely closed.

EMBODIMENT 4

Figure 12A:
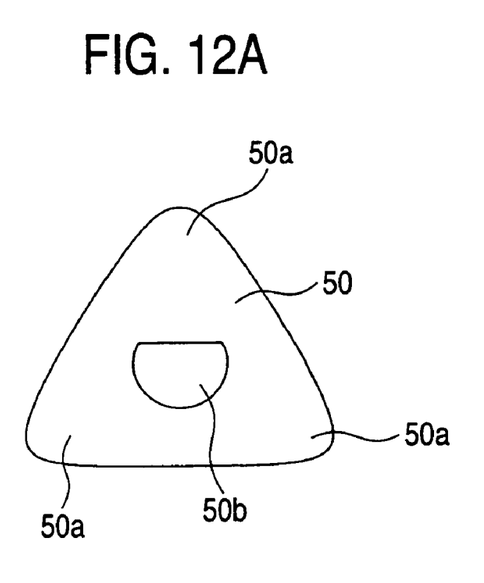
FIG. 12A is a front view and FIG. 12B is a side view.
Figure 12B:
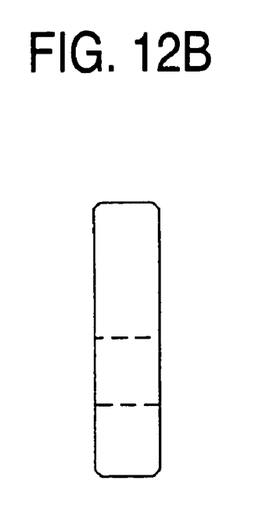
Figure 13:
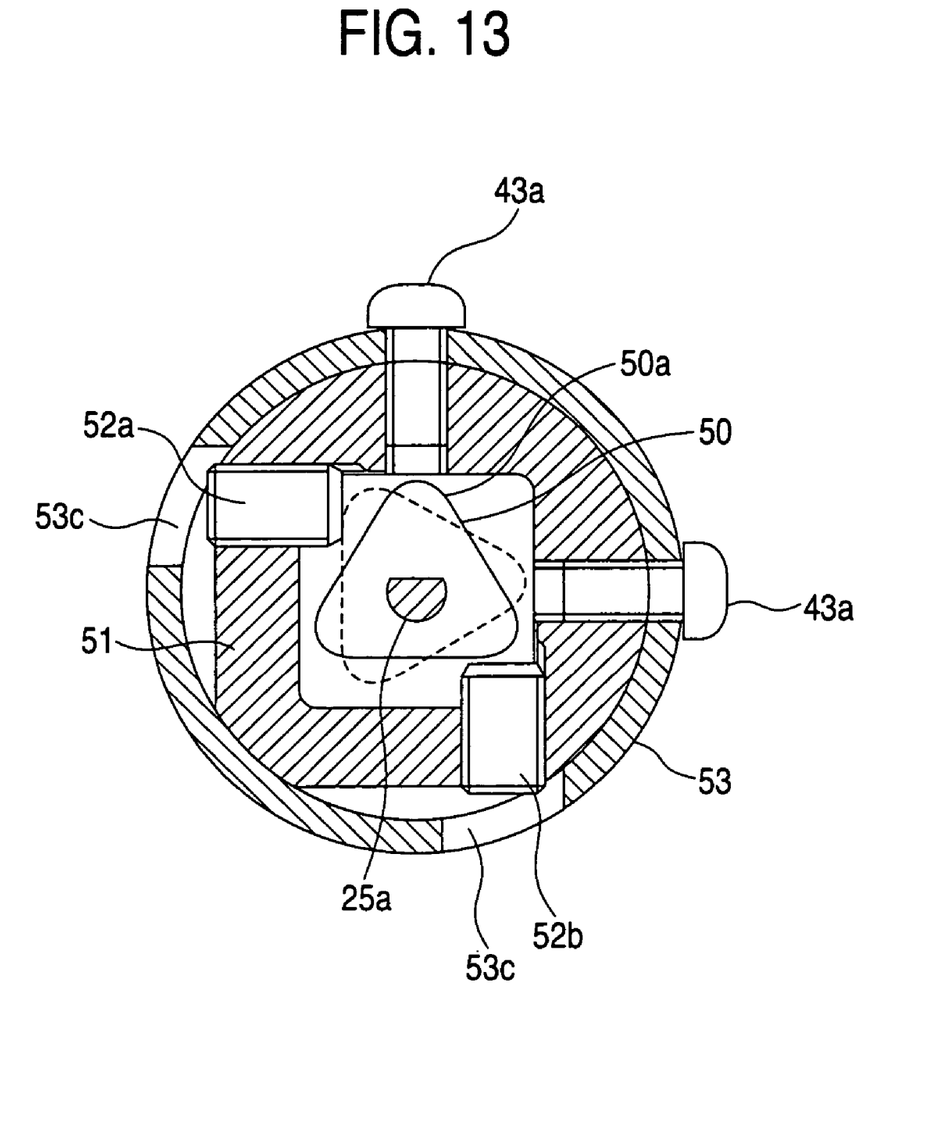
FIG. 13 is a cross-sectional view of the gripper constituted of the locating arm as shown in FIG. 12, corresponding to FIG. 11.

Referring to FIGS. 12A, 12B and 13, an embodiment of the invention will be described below. FIG. 13 is a cross-sectional view like FIG. 11. A gripper of this embodiment employs a locating arm 50, instead of the locating arm 40 of the embodiment 3.

In FIGS. 12A, 12B and 13, the locating arm 50 is triangular, and formed with three arms 50a, 50a and 50a as the contact portion and a hole 50b for fitting the rotational shaft 25a of the motor 25 in the center. A motor retainer 53 is formed with a cylindrical portion at an end portion, the cylindrical portion being formed with the first and second tapped holes 53c, 53c for engaging the stoppers 52a, 52b as the first and second screw members having a threaded portion.

In FIG. 13, the locating arm 50 is securely fitted through the rotational shaft 25a of the motor 25, and has two stoppers 52a and 52b, opposed to the sides of a triangle, which are attached around the outer periphery of the finger holder 51 at the other end portion.

Referring to FIG. 13, the operation of the gripper as constituted above will be described below. The operation is roughly the same as in the embodiment 3. That is, the locating arm 50 is rotated from the position of the solid line to the position of the broken line as indicated in FIG. 13, along with the rotation of the motor 25, until the arm 50a of the locating arm 50 makes contact with the stopper 52a.

On the other hand, if the motor 25 is reversely rotated, the locating arm 50 is rotated back from the position of the broken line to the position of the solid line, until the arm 50a makes contact with the stopper 52b.

And two stoppers 52a and 52b can adjust the projecting amount independently of each other, and thereby adjust the opening and closing amount of the finger 20.

It is needless to say that the gripper has a bottom portion of the cylindrical portion fitted into the nut retainer 41b formed slightly deeper than the locating arm 50 leads to the stopper 52a.

EMBODIMENT 5

Figure 14A:
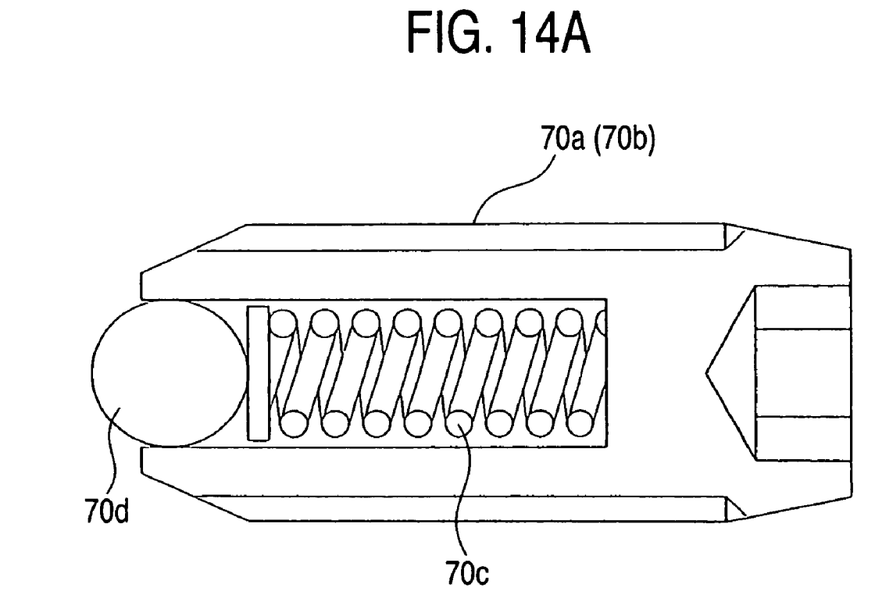
FIG. 14A is a cross-sectional view and FIG. 14B is a front view.
Figure 14B:
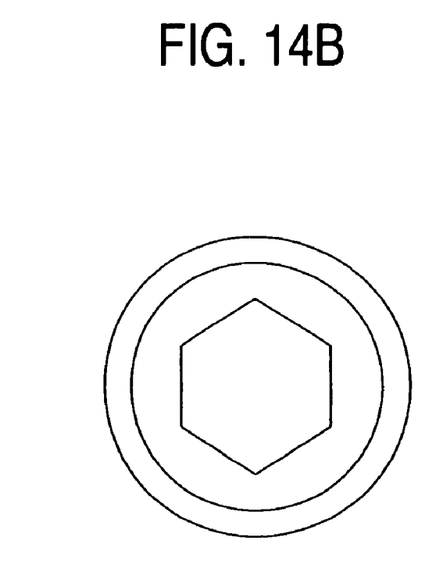

Referring to FIGS. 14A and 14B, an embodiment of the invention will be described below. The embodiment has a feature of using the ball plungers 70a and 70b as shown in FIGS. 14A and 14B, instead of two stoppers 52a and 52b in FIG. 13. The ball plungers 70a and 70b have a function of flexibly stopping a moving object by absorbing a kinetic energy of the moving object. Therefore, a spring 70c is contained within the screw in a compressed state, and a ball 70d is fitted via a spacer at a contact portion with a movable portion.

Accordingly, if the locating arm 50 is rotated in a direction from the position of the solid line to the position of the broken line or its opposite direction, along with the rotation of the motor 25, it is rotated until the arm 50a of the locating arm 50 makes contact with the ball plungers 70a and 70b, as shown in FIG. 13. By this contact, the arm 50a of the locating arm 50 collides with the ball plungers 70a, 70b at a rotation rate of the locating arm 50, but the ball 70d is displaced momentarily via the spring 70c to damp a striking energy.

INDUSTRIAL APPLICABILITY

As described above, this invention is suitable for the uses of the gripper.

The invention claimed is:

1. A gripper comprising:
    a driving source for driving a translational portion that is moved in translation, said driving source being contained within a case;
    a displacement expanding member which is operable to grip an object, the displacement expanding member having one end connected to said translational portion, and another end being connected to said case, in which when said one end is pulled upon a movement of said translational portion, said displacement expanding member is displaced to grip the object at a common top end of the displacement expanding member;
    a plate-like stopper member connected to one end of said displacement expanding member and having a projecting piece around the outer periphery thereof;
    a first holder member having a cylindrical portion with a first notch for inserting loosely the projecting piece of said stopper member, and provided with a threaded portion around the outer periphery of said cylindrical portion;
    a locating nut for adjusting a predetermined gap from said stopper member by being threadingly engaged with said threaded portion of said holder member; and
    pressing means for pressing said locating nut.

2. The gripper according to claim 1, further comprising a connection member having a connection portion for connecting one end of said displacement expanding member and a projection projecting in a direction against said connection portion, and said holder member having a concave portion for allowing said connection member to be engaged in.

3. The gripper according to claim 2, further comprising a mounting adapter member having a reference portion, with a convex portion at one end, serving as a reference for mounting and a flange portion, and said holder member having a second notch provided on a cylindrical portion of said holder member to be engaged by a convex portion of said mounting adapter member.

4. The gripper according to claim 1, further comprising a mounting adapter member having a reference portion, with a convex portion at one end, serving as a reference for mounting and a flange portion, and said holder member having a second notch provided on a cylindrical portion of said holder member to be engaged by a convex portion of said mounting adapter member.

5. The gripper according to claim 1, wherein said one end and said another end are distal to said common top end.

6. The gripper according to claim 1, wherein said displacement expanding member is in the form of a first finger and a second finger, and wherein said first finger includes said one end and said another end, and said second finger includes an additional one end and an additional another end, the ends of the second finger correspond to the ends of the first finger.

7. The gripper according to claim 6, wherein the one end of the first finger is connected to the additional one end of the second finger through a shared portion.

8. A gripper comprising:
a driving source for driving a translational portion that is moved in translation, said driving source being contained within a case;
a displacement expanding member which is operable to grip an object, the displacement expanding member having one end connected to said translational portion, with another end being connected to said case, in which when said one end is moved upon a movement of said translational portion, said another end is held in place while the displacement expanding member is displaced to grip said object at a common top end of the displacement expanding member;
a holder member, to which said another end of said displacement expanding member is connected, having a cylindrical portion and a tapped hole bored in said cylindrical portion;
a screw member threadingly engaging said tapped hole; and
a locating member secured to said translational portion and having a contact portion making contact with said screw member,
wherein said locating member is operable to rotate so as to abut said screw member and limit the displacement of said displacement expanding member.

9. The gripper according to claim 8, wherein said contact portion is shaped as a triangle, said tapped hole comprises at least two holes of a first tapped hole and a second tapped hole, and said screw member has a first screw member and a second screw member, in which said first screw member and said second screw member make contact with different sides of said triangle.

10. The gripper according to claim 9, wherein said screw member has a shock eliminating function for absorbing a columnar shock on said screw member at a top end.

11. The gripper according to claim 8, wherein said screw member has a shock eliminating function for absorbing a columnar shock on said screw member at a top end.

12. The gripper according to claim 8, wherein said one end of said displacement expanding member and said another end of said displacement expanding member are respectively disposed at a position distal to tips of said displacement expanding member.

13. The gripper according to claim 8, wherein said screw member is disposed to extend in a direction perpendicular to said translation portion.

14. The gripper according to claim 8, wherein said one end and said another end are distal to said common top end.

15. The gripper according to claim 8, wherein said displacement expanding member is in the form of a first finger and a second finger, and wherein said first finger includes said one end and said another end, and said second finger includes an additional one end and an additional another end, the ends of the second finger correspond to the ends of the first finger.

16. The gripper according to claim 15, wherein the one end of the first finger is connected to the additional one end of the second finger through a shared portion.

17. A gripper comprising:
a driving source for driving a translational portion that is moved in translation, said driving source being contained within a case;
a displacement expanding member which is operable to grip an object, the displacement expanding member having one end connected to said translational portion, with another end being connected to said case, in which when said one end is moved upon a movement of said translational portion, said displacement expanding member is displaced to grip an object at a common top end of the displacement expanding member;
a holder member, to which said another end of said displacement expanding member is connected, having a cylindrical portion and a tapped hole bored in said cylindrical portion;
a screw member threadingly engaging said tapped hole; and
a locating member secured to said translational portion and having a contact portion making contact with said screw member,
wherein said contact portion is shaped as a triangle, said tapped hole comprising at least two holes of a first tapped hole and a second tapped hole, said screw member has a first screw member and a second screw member, in which said first screw member and said second screw member make contact with different sides of said triangle.

18. The gripper according to claim 17, wherein said one end and said another end are distal to said common top end.

19. The gripper according to claim 17, wherein said displacement expanding member is in the form of a first finger and a second finger, and wherein said first finger includes said one end and said another end, and said second finger includes an additional one end and an additional another end, the ends of the second finger correspond to the ends of the first finger.

20. The gripper according to claim 19, wherein the one end of the first finger is connected to the additional one end of the second finger through a shared portion.

* * * * *